United States Patent [19]

Niibo et al.

[11] Patent Number: 5,776,358
[45] Date of Patent: Jul. 7, 1998

[54] ELECTROLYTE FOR DRIVING ELECTROLYTIC CAPACITOR AND ELECTROLYTIC CAPACITOR USING THE SAME

[75] Inventors: Nario Niibo; Naoko Yoshida, both of Osaka; Yoshinori Takamuku, Kyoto, all of Japan

[73] Assignee: Matsushita Electric Industrial Co., Ltd., Osaka, Japan

[21] Appl. No.: 732,372

[22] PCT Filed: Feb. 29, 1996

[86] PCT No.: PCT/JP96/00473

§ 371 Date: May 2, 1997

§ 102(e) Date: May 2, 1997

[87] PCT Pub. No.: WO96/27201

PCT Pub. Date: Sep. 6, 1996

[30] Foreign Application Priority Data

Mar. 2, 1995 [JP] Japan .................................. 7-042892

[51] Int. Cl.$^6$ ............................................ H01G 9/022
[52] U.S. Cl. ................. 252/62.2; 361/503; 361/504; 361/505; 361/506; 429/194; 429/197; 429/198; 429/203; 429/204
[58] Field of Search ................. 252/62.2; 361/503, 361/504, 505, 506; 429/194, 197, 198, 203, 204

[56] References Cited

U.S. PATENT DOCUMENTS 5,177,673  1/1993  Nagara et al. ........................ 252/62.2
5,485,346  1/1996  Kanbara et al. ...................... 361/506

FOREIGN PATENT DOCUMENTS 2-312218  12/1990  Japan .
3-74827   3/1991   Japan .

*Primary Examiner*—Bruce F. Bell
*Attorney, Agent, or Firm*—McDermott, Will & Emery

[57] ABSTRACT

The invention relates to an electrolyte for driving electrolytic capacitor and an electrolytic capacitor using the same, and by preparing by using a solvent mainly composed of organic compound, and dissolving one or more solutes selected from the group consisting of inorganic acids and organic acids, more specifically adding and dissolving at least one of copolymers of polyethylene glycol and polypropylene glycol shown in formulas (1) and (2), or both of the copolymers of polyethylene glycol and polypropylene glycol shown in formulas (1) and (2) simultaneously, the spark generation voltage and chemical conversion factor of formed oxidation film are enhanced, thereby improving the reliability of the electrolytic capacitor.

$$HO-(C_2H_4O)_n-(C_3H_6O)_m-(C_2H_4O)_n-H \qquad (1)$$

(n and m are arbitrary natural numbers.)

$$HO-[(C_2H_4O)_n-(C_3H_6O)_m]_l-H \qquad (2)$$

(n, m, and l are arbitrary natural numbers.)

16 Claims, 2 Drawing Sheets

ELECTROLYTE FOR DRIVING ELECTROLYTIC CAPACITOR AND ELECTROLYTIC CAPACITOR USING THE SAME

This application is a 371 of PCT/JP96/00473 filed Feb. 29, 1996.

TECHNICAL FIELD

The present invention relates to an electrolyte for driving electrolytic capacitor used in an aluminum electrolytic capacitor, and an electrolytic capacitor using the same.

BACKGROUND ART

Generally, an electrolyte for driving an electrolytic capacitor used in an aluminum electrolytic capacitor is known to be an electrolyte for driving electrolytic capacitor using an organic compound such as gamma-butyrolactone or ethylene glycol as main solvent in which solutes are dissolved, such as boric acid, other inorganic acid, adipic acid, azelaic acid, butyl octane diacid (Japanese Patent Publication 60-13293), 5,6-decane dicarboxylic acid (Japanese Patent Publication 63-15738), dibasic acid having side chain (Japanese Laid-open Patent 1-45539), other dibasic acid, and their salts.

In such electrolytes for driving electrolytic capacitor, since the spark generation voltage and chemical conversion factor are not enough, and when used in an electrolytic capacitor, it may cause troubles such as short puncture due to aging. It has been therefore attempted to solve the problems by adding polyethylene glycol (Japanese Patent Publication 3-76776) or polyglycerin (Japanese Laid-open Patent 2-194611), thereby enhancing the spark generation voltage.

Such compounds have the advantage of increasing the effect of heightening the spark generation voltage as the amount of addition and molecular weight are larger, but solubility in organic solvent, especially at low temperature, is lowered, and precipitation occurs, there arises a limit for selection of amount of addition and molecular weight. It is better to use these compounds at molecular weight of 1000 or less for the sake of precipitation at low temperature. In such range of molecular weight, however, it is not enough to raise the spark generation voltage, and there is a contradictory problem of inducing short puncture at the time of product aging.

Or, when such compounds are composed so as to increase in the amount of addition and molecular weight, precipitation at low temperature may be prevented by adding sufficient water to the electrolyte for driving electrolytic capacitor. In the electrolyte for driving electrolytic capacitor with sufficient addition of water, however, the vapor pressure in the aluminum electrolytic capacitor is raised due to the effect of water, and it is hard to use at 100° C. or higher temperature.

These compounds are more likely to crystallize as the molecular weight increases, and if solidified in wax form, it causes a serious difficulty in working efficiency in mass production.

DISCLOSURE OF THE INVENTION

The invention is intended to solve the problems of the prior art, and it is hence a primary object thereof to present an electrolyte for driving an electrolytic capacitor capable of sufficiently heightening the spark generation voltage and chemical conversion character of formed oxidation film, not precipitating even at low temperature, and an electrolytic capacitor using the same.

BEST MODES OF CARRYING OUT THE INVENTION

The invention relates to an electrolyte for driving electrolytic capacitor prepared by using a solvent mainly composed of an organic compound, and dissolving one or more solutes selected from the group consisting of inorganic acids and organic acids, more specifically adding and dissolving at least one of copolymers of polyethylene glycol and polypropylene glycol shown in formulas (1) and (2), or both of the copolymers of polyethylene glycol and polypropylene glycol shown in formulas (1) and (2) simultaneously, and an electrolytic capacitor using the same.

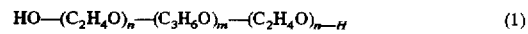

(n and m are arbitrary natural numbers.)

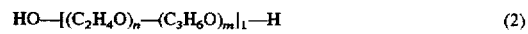

(n, m, and 1 are arbitrary natural numbers.)

Embodiments of the invention are described below. First, concerning precipitation at low temperature, results of measurements of an embodiment of the invention and prior art are shown in Table 1.

TABLE 1

| | Composition | | After 3 hrs at −15° C. |
|---|---|---|---|
| Prior art | Ethylene glycol | 85 | |
| | Polyethylene glycol #4000 | 10 | Precipitated |
| | Ammonium adipate | 5 | |
| Embodiment | Ethylene glycol | 85 | |
| | Polyethylene glycol: polypropylene glycol = 5:5 #4000 | 10 | Not precipitated |
| | Ammonium adipate | 5 | |

As clear from Table 1, in the electrolyte for driving electrolytic capacitor in the embodiment of the invention, no precipitation was observed after 3 hours at −15° C. Only an example of using adipic acid is shown in Table 1, but when other organic acids or inorganic acids were used, same results as in the embodiment of the invention were obtained. Therefore, the low temperature precipitation property of the invention is known to be excellent regardless of the type of the selected solutes.

Figure 1:
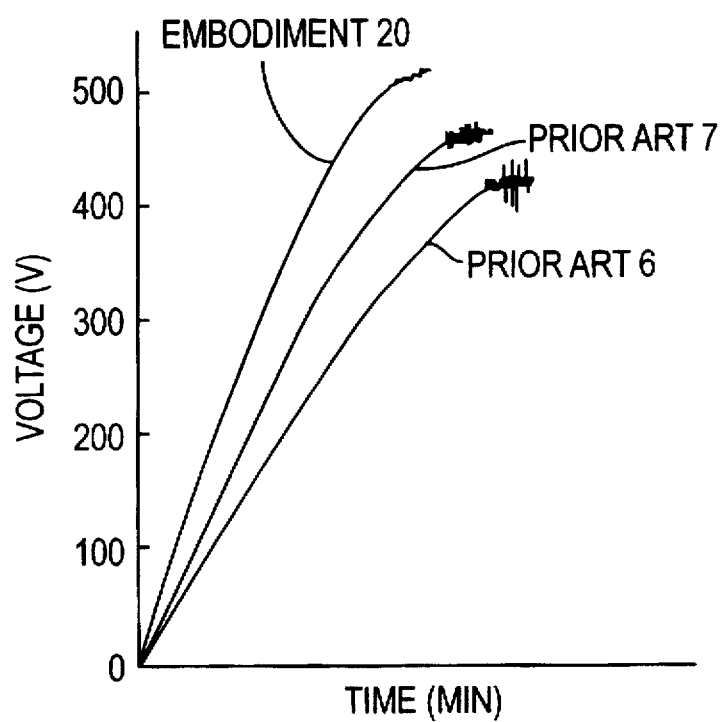
FIG. 1 is a characteristic diagram showing chemical conversion factor of formed oxide film of an electrolyte for driving electrolytic capacitor in an embodiment of the invention and an electrolyte for driving electrolytic capacitor in prior art.

Compositions of the electrolyte for driving electrolytic capacitor and characteristics of embodiments 1 to 20 of the invention and prior arts 1 to 7 are summarized in Table 2, Table 3, and Table 4. Incidentally, the characteristic diagram showing the chemical conversion factor of formed oxidation film of prior arts 6 and 7 and embodiment 20 of the invention are given in FIG. 1. The water content in the electrolyte for driving electrolytic capacitor was commonly adjusted at 1.5% in embodiments 1 to 20 of the invention and prior arts 1 to 7.

TABLE 2

| | Composition | (wt %) | Conductivity (mS/cm) | Spark generation voltage (V) |
|---|---|---|---|---|
| Prior art 1 | Ethylene glycol<br>Ammonium borate | 85<br>15 | 0.5 | 550 |
| Prior art 2 | Ethylene glycol<br>Diammonium azelate | 90<br>10 | 2.8 | 320 |
| Prior art 3 | Ethylene glycol<br>Ammonium benzoate | 90<br>10 | 3.2 | 280 |
| Prior art 4 | Ethylene glycol<br>Diammonium adipate | 90<br>10 | 3.5 | 300 |
| Prior art 5 | Ethylene glycol<br>5,6-Decane dicarboxylic acid diammonium | 90<br>10 | 2.0 | 420 |
| Prior art 6 | Ethylene glycol<br>1,7-Octane dicarboxylic acid diammonium | 90<br>10 | 2.0 | 420 |
| Prior art 7 | Ethylene glycol<br>Polyglycerin #1000<br>1,7-Octane dicarboxylic acid diammonium | 80<br>10<br>10 | 1.5 | 460 |

TABLE 3

| | Composition | (wt %) | Conductivity (mS/cm) | Spark generation voltage (V) |
|---|---|---|---|---|
| Embodiment 1 | Ethylene glycol<br>Polyethylene glycol:polypropylene glycol = 5:5 #1000<br>Ammonium benzoate | 80<br>10<br><br>10 | 2.55 | 380 |
| Embodiment 2 | Ethylene glycol<br>Polyethylene glycol:polypropylyene glycol = 5:5 #2000<br>Ammonium benzoate | 80<br>10<br><br>10 | 2.50 | 380 |
| Embodiment 3 | Ethylene glycol<br>Polyethylene glycol:polypropylene glycol = 5:5 #4000<br>Ammonium benzoate | 80<br>10<br><br>10 | 2.48 | 385 |
| Embodiment 4 | Ethylene glycol<br>Polyethylene glycol:polypropylene glycol = 5:5 #6000<br>Ammonium benzoate | 80<br>10<br><br>10 | 2.45 | 385 |
| Embodiment 5 | Ethylene glycol<br>Polyethylene glycol:polypropylene glycol = 5:5 #10000<br>Ammonium benzoate | 80<br>10<br><br>10 | 2.45 | 390 |
| Embodiment 6 | Ethylene glycol<br>Polyethylene glycol:polypropylene glycol = 5:5 #20000<br>Ammonium benzoate | 80<br>10<br><br>10 | 2.45 | 395 |
| Embodiment 7 | Ethylene glycol<br>Polyethylene glycol:polypropylene glycol = 4:6 #2000<br>Ammonium benzoate | 80<br>10<br><br>10 | 2.50 | 380 |
| Embodiment 8 | Ethylene glycol<br>Polyethylene glycol:polypropylene glycol = 4:6 #4000<br>Ammonium benzoate | 80<br>10<br><br>10 | 2.48 | 385 |
| Embodiment 9 | Ethylene glycol<br>Polyethylene glycol:polypropylene glycol = 4:6 #20000<br>Ammonium benzoate | 80<br>10<br><br>10 | 2.45 | 395 |
| Embodiment 10 | Ethylene glycol<br>Polyethylene glycol:polypropylene glycol = 1:9 #2000<br>Ammonium benzoate | 80<br>10<br><br>10 | 2.50 | 380 |

TABLE 4

| | Composition | (wt %) | Conductivity (mS/cm) | Spark generation voltage (V) |
|---|---|---|---|---|
| Embodiment 11 | Ethylene glycol<br>Polyethylene glycol:polypropylene glycol = 1:9 #4000<br>Ammonium benzoate | 80<br>10<br><br>10 | 2.50 | 385 |
| Embodiment 12 | Ethylene glycol<br>Polyethylene glycol:polypropylene glycol = 1:9 #20000<br>Ammmonium benzoate | 80<br>10<br><br>10 | 2.47 | 395 |
| Embodiment 13 | Ethylene glycol<br>Polyethylene glycol:polypropylene glycol = 2:8 #2000<br>Ammonium benzoate | 80<br>10<br><br>10 | 2.50 | 380 |
| Embodiment 14 | Ethylene glycol<br>Polyethylene glycol:polypropylene glycol = 2:8 #4000<br>Ammonium benzoate | 80<br>10<br><br>10 | 2.48 | 385 |
| Embodiment 15 | Ethylene glycol<br>Polyethylene glycol:polypropylene glycol = 2:8 #20000<br>Ammonium benzoate | 80<br>10<br><br>10 | 2.43 | 395 |
| Embodiment 16 | Ethylene glycol<br>Polyethylene glycol:polypropylene glycol = 5:5 #2000<br>1,6-Decane dicarboxylic acid diammonium | 80<br>10<br><br>10 | 2.50 | 500 |
| Embodiment 17 | Ethylene glycol<br>Polyethylene glycol:polypropylene glycol = 5:5 #2000<br>5,6-Decane dicarboxylic acid diammonium | 80<br>10<br><br>10 | 1.50 | 500 |
| Embodiment 18 | Ethylene glycol<br>Polyethylene glycol:polypropylene glycol = 5:5 #2000<br>1,7-Octane dicarboxylic acid diammonium | 89.9<br>0.1<br><br>10 | 2.00 | 450 |
| Embodiment 19 | Ethylene glycol<br>Polyethylene glycol:polypropylene glycol = 5:5 #2000<br>1,7-Octane dicarboxylic acid diammonium | 89<br>1<br><br>10 | 2.00 | 470 |
| Embodiment 20 | Ethylene glycol<br>Polyethylene glycol:polypropylene glycol = 5:5 #2000<br>1,7-Octane dicarboxylic acid diammonium | 80<br>10<br><br>10 | 1.50 | 500 |

As clear from Table 2, Table 3 and Table 4, in the embodiments of the invention, when the solutes are same as in the prior arts, the spark generation voltage can be enhanced notably. As a result, the incidence of short puncture in aging process can be lowered. Still more, the electrolyte for driving electrolytic capacitor adding copolymers of polyethylene glycol and polypropylene glycol of the invention can dramatically enhance the chemical conversion factor of the formed oxidation film, as well as the spark generation voltage, as understood from FIG. 1.

Moreover, as known from embodiments 18 to 20 of the invention in Table 2, by adjusting the amount of addition, the spark generation voltage can be raised while maintaining the conductivity, so that the dielectric strength can be stabilized without raising the resistance of the aluminum electrolytic capacitor.

Table 5 shows results of life test of aluminum electrolytic capacitors by preparing 20 samples each of aluminum electrolytic capacitors using the electrolyte for driving electrolytic capacitor in prior arts 2 and 3 and aluminum electrolytic capacitors using the electrolyte for driving electrolytic capacitor in embodiments 2, 3 and 4 shown in Table 2 and Table 3. The rating of all aluminum electrolytic capacitors was 250 WV 670 μF, and the test temperature was 110° C.

Figure 2:
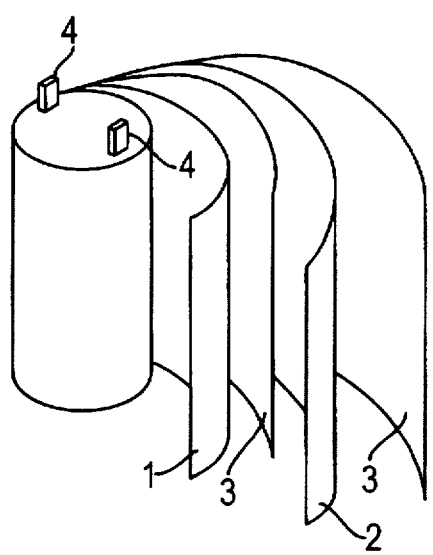
FIG. 2 is a perspective view showing an element portion of an aluminum electrolytic capacitor.

FIG. 2 shows the composition of the element portion of the aluminum electrolytic capacitor, and as shown in FIG. 2, the element is composed by taking up an anode foil 1 as a positive electrode made of aluminum, and a cathode foil 2 as negative electrode made of also aluminum oppositely through an interposed separator 3. An outgoing lead 4 is connected to the anode foil 1 and cathode foil 2 of this element.

The element in such composition is impregnated with a driving electrolyte, and the element is sealed in a case such as an aluminum case, so that an aluminum electrolytic capacitor is composed.

TABLE 5

| | Initial characteristic | | After 2000 hrs at 110° C. | | | |
|---|---|---|---|---|---|---|
| | tan δ (%) | LC (μA) | Δ C % | tan δ (%) | LC (μA) | Remarks |
| Prior art 2 | 6.0 | 32.5 | −6.8 | 15.0 | 43.2 | Open valve trouble in 3/20 samples |
| Prior art 3 | 5.1 | 65.3 | Test discontinued | | | Short puncture in 15/20 samples |
| Embodiment 2 | 5.7 | 21.5 | 0 | 6.5 | 10.1 | No problem |
| Embodiment 3 | 5.7 | 25.1 | 0 | 6.5 | 9.7 | No problem |
| Embodiment 4 | 5.7 | 20.3 | 0 | 6.5 | 9.5 | No problem |

As clear from Table 5, in the aluminum electrolytic capacitors using the electrolyte for driving electrolytic capacitor in prior art 2, open valve troubles occurred in 3 out of 20 samples during life test. In prior art 3, short puncture occurring in 15 out of 20 samples during aging, and the life test could not be continued. By contrast, in the aluminum electrolytic capacitors using the electrolyte for driving electrolytic capacitor in embodiments 2, 3 and 4 of the invention, short puncture did not occur during aging or throughout the life test, and the characteristics in 2000 hours at 110° C. of life test, as compared with the initial characteristics, were small in change rate of electrostatic capacity (ΔC), small in increase of tangent of loss angle (tan δ), and stable in leakage current (LC), so that aluminum electrolytic capacitors of stable life characteristics could be obtained.

Moreover, results of evaluation in 450 WV class are shown in Table 6. Table 6 shows results of life test of aluminum electrolytic capacitors, by preparing 20 samples each of aluminum electrolytic capacitors using the electrolyte for driving electrolytic capacitor in prior art 6 and aluminum electrolytic capacitors using the electrolyte for driving electrolytic capacitor in embodiment 20 shown in Table 2 and Table 4. The rating of all aluminum electrolytic capacitors was 450 WV 330 μF, and the test temperature was 110° C.

TABLE 6

| | Initial characteristic | | After 2000 hrs at 110° C. | | | |
|---|---|---|---|---|---|---|
| | tan δ (%) | LC (μA) | Δ C % | tan δ (%) | LC (μA) | Remarks |
| Prior art 6 | 3.1 | 28.4 | Test discontinued | | | Short puncture in 10/20 samples |
| Embodiment 20 | 3.8 | 20.5 | 0 | 5.1 | 9.5 | No problem |

As clear from Table 6, in the aluminum electrolytic capacitors using the electrolyte for driving electrolytic capacitor in prior art 6, short puncture occurring in 10 out of 20 samples during aging. By contrast, in the aluminum electrolytic capacitors using the electrolyte for driving electrolytic capacitor in embodiment 20 of the invention, short puncture did not occur during aging or throughout the life test, and the characteristics in 2000 hours at 110° C. of life test, as compared with the initial characteristics, were small in change rate of electrostatic capacity (ΔC), small in increase of tangent of loss angle (tan δ), and stable in leakage current (LC), so that aluminum electrolytic capacitors of stable life characteristics could be obtained.

The solvent of these embodiments of the invention described so far is ethylene glycol, but it was confirmed that similar effects were obtained by selecting, instead, at least one type of glycol ethers such as ethylene glycol monomethyl ether, acid amids such as dimethyl formamide, and cyclic esters such as gamma-butyrolactone. As an example, Table 7 shows embodiment 21 of the invention using gamma-butyrolactone as solvent and prior art 8 as comparative example.

TABLE 7

| | Composition | (wt %) | Conductivity (mS/cm) | Spark generation voltage (V) |
|---|---|---|---|---|
| Prior art 8 | Gamma-butyrolactone | 80 | 3.50 | 100 |
| | Phthalic acid | 10 | | |
| | Triethylamine | 3 | | |
| Embodiment 21 | Ethylene glycol | 80 | 3.50 | 150 |
| | Polyethylene glycol: polypropylene glycol = 5:5 #2000 | 2 | | |
| | Phthalic acid | 10 | | |
| | Triethylamine | 3 | | |

As clear from Table 7, even in a different solvent system, the spark generation voltage can be sufficiently heightened.

Incidentally, as shown in formulas (1) and (2), the structure of the copolymer of polyethylene glycol and polypropylene glycol is similar in performance whether in block copolymer or in random copolymer, and similar effects are expected.

When adding and dissolving the copolymer of polyethylene glycol and polypropylene glycol in formulas (1) and (2) in an electrolyte for driving electrolytic capacitor, at least one or more of copolymers of polyethylene glycol and polypropylene glycol, or both of copolymers of polyethylene glycol and polypropylene glycols shown in formulas (1) and (2) may be added and dissolved simultaneously.

The molecular weight of the copolymer of polyethylene glycol and polypropylene glycol shown in formulas (1) and (2) is preferably in a range of 1000 to 20000 as clear from the embodiments of the invention, and the amount of addition of the copolymer of polyethylene glycol and polypropylene glycol shown in formulas (1) and (2) is preferably in a range of 0.1 to 10 wt. % as clear from the embodiments of the invention.

INDUSTRIAL APPLICABILITY

As obvious from the description herein, since the copolymer used in the electrolyte for driving the electrolytic capacitor of the invention is prepared by copolymerizing polyethylene glycol of which defect if high crystallinity, and polypropylene glycol low in solubility in organic solvent but low in degree of crystallization, mutual defects are compensated for each other, so that the problem of precipitation at low temperature can be solved. By solving this problem, the range of selection of usable amount of addition and molecular weight is broadened, and the spark generation voltage and chemical conversion factor of formed oxidation film can be enhanced, so that the reliability of the aluminum electrolytic capacitor from low voltage to medium and high voltage can be enhanced.

What is claimed is:

1. An electrolyte for driving an electrolytic capacitor prepared by using a solvent comprising an organic compound, and dissolving one or more solutes selected from the group consisting of at least one random copolymer of polyethylene glycol and polypropylene glycol shown in formula (1)

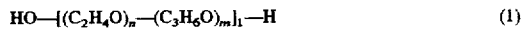

HO—[(C$_2$H$_4$O)$_n$—(C$_3$H$_6$O)$_m$]$_1$—H    (1)

(1 is not less than 2 each value of m and n is not less than 1 and each one of the plurality of m is the same or different and each one of the plurality of n is the same or different).

2. An electrolyte for driving an electrolytic capacitor of claim 1, wherein the molecular weight of the random copolymer of polyethylene glycol and polypropylene glycol shown in formula (1) ranges from 1,000 to 20,000.

3. An electrolyte for driving an electrolytic capacitor of claim 1, wherein the amount of the random copolymer of polyethylene glycol and polypropylene glycol shown in formula (1) ranges from 0.1 to 10 wt %.

4. An electrolyte for driving an electrolytic capacitor of claim 1, wherein the molecular weight of the random copolymer of polyethylene glycol and polypropylene glycol shown in formula (1) ranges from 1,000 to 20,000, and wherein the amount of the random copolymer of polyethylene glycol and polypropylene glycol shown in formula (1) ranges from 0.1 to 10 wt %.

5. An electrolytic capacitor using an electrolyte for driving the electrolytic capacitor prepared by using a solvent comprising an organic compound, and dissolving one or more solutes selected from the group consisting of at least one random copolymer of polyethylene glycol and polypropylene glycol shown in formulas (1)

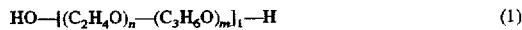

HO—[(C$_2$H$_4$O)$_n$—(C$_3$H$_6$O)$_m$]$_1$—H    (1)

(1 is not less than 2, each value of m and n is not less than 1, and each one of the plurality of m is the same or different and each one of the plurality of n is the same or different).

6. An electrolyte for driving an electrolytic capacitor of claims 1–5, wherein n:m ranges from 1:1 to 1:9.

7. An electrolyte for driving an electrolytic capacitor comprising: a solvent comprising at least one of ethylene glycol and propylene glycol,
an electrolytic material including at least one of an organic compound and inorganic compound, the electrolytic material being dissolved in the solvent, and
a solute having a random copolymer of ethylene glycol as shown by a formula —C$_2$H$_4$O—, and propylene glycol as shown by a formula —C$_3$H$_6$O—, the random copolymer being dissolved in the solvent.

8. An electrolyte for driving an electrolytic capacitor comprising:
a solvent including at least one of ethylene glycol and propylene glycol,
an electrolytic material comprising ammonium benzoate which is dissolved in the solvent, and
a solute including a random copolymer of ethylene glycol and propylene glycol which is dissolved in the solvent.

9. An electrolyte for driving an electrolytic capacitor comprising:
a solvent comprising at least one of ethylene glycol and propylene glycol,
an electrolytic material including 5, 6-decane dicarboxylic acid diammonium which is dissolved in the solvent, and
a solute including a random copolymer of ethylene glycol and propylene glycol which is dissolved in the solvent.

10. An electrolyte for driving an electrolytic capacitor comprising:
a solvent including at least one of ethylene glycol and propylene glycol,
an electrolytic material including 1,7-octane dicarboxylic acid diammonium which is dissolved in the solvent, and
a solute including a random copolymer of ethylene glycol and propylene glycol which is dissolved in the solvent.

11. An electrolyte for driving an electrolytic capacitor comprising:
a solvent including at least one of ethylene glycol and propylene glycol,
an electrolytic material including phthalic acid triethylamine which is dissolved in the solvent, and
a solute comprising a random copolymer of ethylene glycol and propylene glycol which is dissolved in the solvent.

12. An electrolyte for driving an electrolytic capacitor of claims 7, 8, 9, 10 or 11, wherein a molecular weight of the random copolymer ranges from 1,000 to 20,000.

13. An electrolyte for driving an electrolytic capacitor of claims 7, 8, 9, 10 or 11, wherein an amount of the random copolymer ranges from 0.1 wt % to 10 wt %.

14. An electrolyte for driving an electrolytic capacitor of claims 7, 8, 9, 10 or 11, wherein the n:m ratio which is the ratio of ethylene glycol "n" to propylene glycol "m" of the random copolymer ranges from 1:1 to 1:9 in mole ratio.

15. An electrolyte for driving an electrolytic capacitor of claims 7, 8, 9, 10 or 11, wherein a molecular weight of the random copolymer ranges from 1,000 to 20,000, and wherein an amount of the random copolymer ranges from 0.1 wt % to 10 wt %.

16. An electrolyte for driving an electrolytic capacitor of claims 7, 8, 9, 10 or 11, wherein a molecular weight of the random copolymer ranges from 1,000 to 20,000, wherein an amount of the random copolymer ranges from 0.1 wt % to 10 wt %, and wherein the n:m ratio which is the ratio of ethylene glycol n to propylene glycol m of the random copolymer ranges from 1:1 to 1:9 in mole ratio.

* * * * *